G. M. DOWE.
SIGNAL CONTROLLING DEVICE.
APPLICATION FILED APR. 7, 1919. RENEWED AUG. 12, 1920.
1,395,562.
Patented Nov. 1, 1921.
2 SHEETS—SHEET 2.
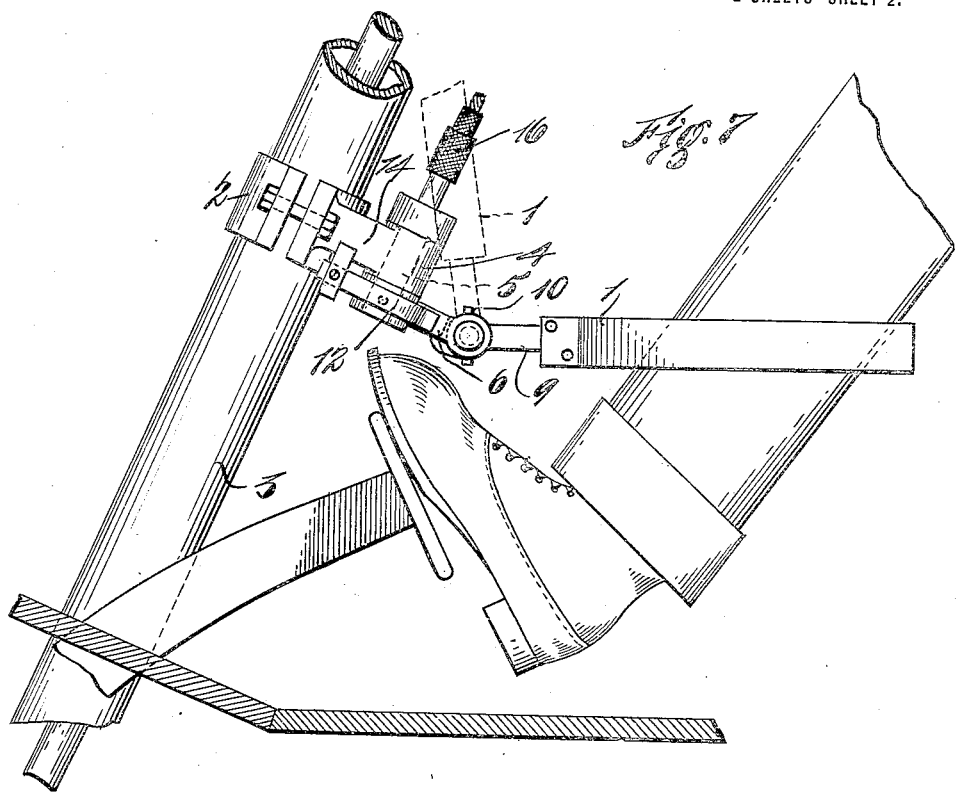
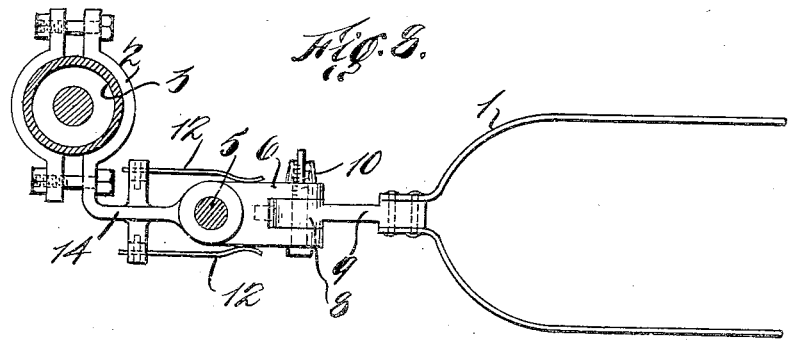
INVENTOR
George M. Dowe

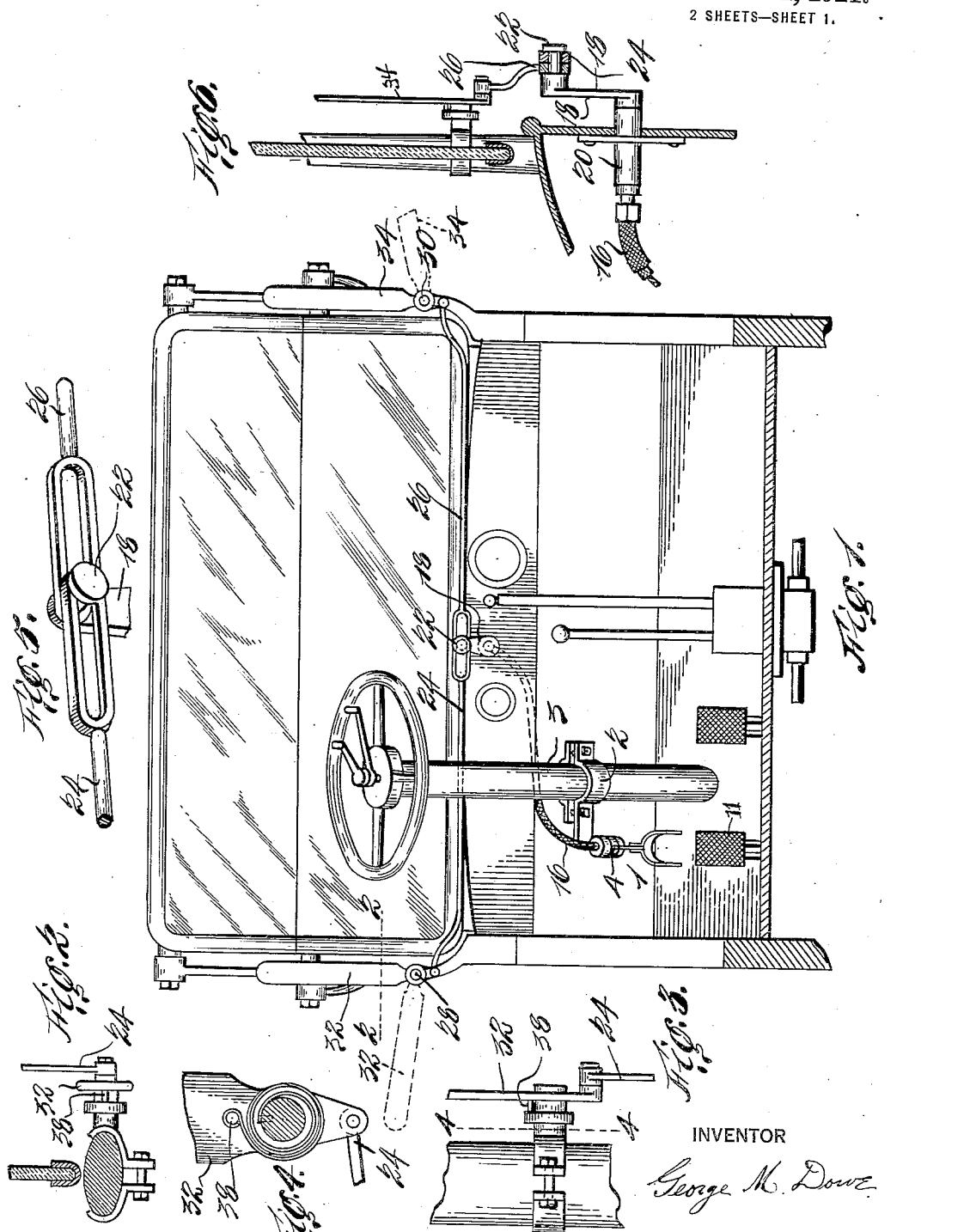

UNITED STATES PATENT OFFICE.

GEORGE M. DOWE, OF NEW YORK, N. Y.

SIGNAL-CONTROLLING DEVICE.

1,395,562. Specification of Letters Patent. Patented Nov. 1, 1921.

Application filed April 7, 1919, Serial No. 288,053. Renewed August 12, 1920. Serial No. 403,140.

*To all whom it may concern:*

Be it known that I, GEORGE M. DOWE, a citizen of the United States, residing at the borough of Richmond, New York city, New York, have invented certain new and useful Improvements in Signal-Controlling Devices, of which the following is a clear, full, and exact description.

This invention relates to signals for automobiles and other vehicles, and more particularly to the means whereby such signals are set, and an object of the invention is to improve such setting or controlling means and arrange such control so as to enable the driver to set a signal or signals without removing either his hands or his feet from the usual controlling devices of the vehicle.

Heretofore, as far as I am aware, signal devices for showing right and left turns and stops, have been operated by buttons, or the like, situated on or adjacent to the steering wheel, their operation requiring the removal of at least one hand from its normal position on the steering wheel; or such devices have been controlled by levers requiring either the hand or the foot of the driver to be removed from the usual controlling devices of the vehicle in order to operate them. With the present high degree of development of the motor vehicle, both hands and both feet are kept quite busy most of the time, and especially is this true when coming to a stop, or when about to make a turn. I am aware, too, that signal devices have been proposed which are set or controlled by the operation of the steering mechanism in moving one way or the other. Such latter devices, however, do not set the signal in advance. The ordinary practice of holding out the arm or hand necessitates its removal from the steering wheel, just at the time when it is most needed to steer easily and conveniently. Furthermore, in closed body cars it is not feasible to hold out the hand.

My invention seeks, among other things, to overcome the objections to the various operating means heretofore proposed, by leaving the driver's hands and feet entirely free to control the usual devices necessary to the proper operation of the car, and at the same time to provide controlling means whereby a signal or signals are set in advance to indicate the change that is to be made in the condition of the car. To this end, I provide a member so situated as to be readily engaged by the leg of the driver to be operated by a rocking or lateral movement thereof. The signal or signals to be displayed by movement of the said member may be of any desired type, either electrical or mechanical, and may be rear signals or signals displayed at the sides of the car or both, and in the practical embodiment of the invention, I have shown such signals in the form of semaphore arms supported from the wind shield frame.

Other objects and advantages of the invention will become apparent from a consideration of the following detailed description and claims when taken in connection with the accompanying drawings, in which—

Figure 1 is an elevational view of a conventional dash of an automobile showing the manner of applying my improvements;

Fig. 2 is a section on the line 2—2, Fig. 1;

Fig. 3 is a side elevation of a detail showing a bracket, semaphore arm and its operating link;

Fig. 4 is a part front elevational view of the parts shown in Fig. 3, and part sectional view on the line 4—4 of said figure;

Fig. 5 is a perspective view of the operating links for the semaphore arms;

Fig. 6 is a sectional detail showing the connections from the flexible shaft to one of the semaphore arms;

Fig. 7 is a side elevation of parts shown in Fig. 1, and particularly of the member for controlling the signal devices and the manner of operating the controlling member by the leg of the driver; and Fig. 8 is a top plan view of the controlling member.

Fig. 1 shows a conventional dash of an automobile including the instrument board, operating levers and brake pedals, and in this view 1 indicates a signal setting or controlling member, which is preferably in the form of a yoke, and the forks of which are designed to embrace the leg of the driver of the car substantially in the manner shown in Fig. 7, whereby a slight movement of the leg to one side or the other will serve to set signal devices or control their setting. Said member may be supported in convenient position for this purpose in any desired manner and in the practical embodiment shown, a bracket 2 is clamped to the steering post 3, or otherwise supported thereon in a manner to be adjustable along the post, if desired. On the bracket is formed a sleeve 4, Fig. 7, in which is mounted a stud 5 forming part of a member 6, said member 6 being forked to form a bearing for the end 9 of the controlling member. This construction is convenient when it is desired to throw the controlling member up or down out of the way when getting into or out of the seat. The bearing 8 may have a clamping screw or thumb nut 10 to adjust the degree of tightness of the bearing. In Fig. 7 the controlling member is shown in dotted lines moved to position out of the way. When in operative working position, however, it may occupy the position shown in full lines in said figure and when moved from a central position to one side or to the other it serves to control the setting of a signal device or devices. Preferably, the controlling member is mounted on the left side of the steering post to be controlled by the left leg of the driver, and is moved by a slight lateral or rocking motion of this leg without taking the left foot off of the clutch pedal 11, which pedal is usually situated to the left side of the steering post. To normally maintain the controlling member in central position, I may provide springs 12 fastened to the arm 14 of the bracket and bearing against the sides of the member 6, as shown in Figs. 7 and 8.

Lateral motion of the controlling member and consequently of the stud 5 is transmitted to the signal devices by a flexible shaft 16 connected to the stud 5. Other forms of connections may be provided but to suit different constructions of cars, a flexible shaft has advantages over other forms of connections when the signal devices are mechanically operated. The other end of the flexible shaft may be carried to the back of the instrument board where it connects with a crank arm 18 (Fig. 6), said arm being journaled in a sleeve 20 secured to the instrument board. The crank arm carries a headed pin 22 for engaging and operating links 24 and 26, said links being slotted, as shown, and being connected each to a semaphore arm pivoted at 28 and 30, respectively, to the wind shield frame. These semaphore arms may be made of any desirable or suitable material depending on the kind of car on which they are used and other circumstances. Their size and length may also vary. Normally the arms are held in substantially vertical position each by a spring fastened at one end at 38 to each arm, Fig. 4, and at its other end to the pivot about which the arm swings, although any suitable means may be used to hold the arms in normal position. When the controlling member 1, is moved to the left, for instance, the link 24 is also moved and arm 32 rocked from full line position to dotted line position, Fig. 1. Movement of the controlling member to the right sets the right arm 34.

One advantage of placing the semaphore arms near the front is that they may be readily observed by pedestrians as the vehicle approaches. It is certainly very convenient, if not at times absolutely necessary to his safety, that a pedestrian be apprised as to whether an approaching vehicle is going to keep straight ahead or whether it is going to turn, and if to turn, whether to the right or to the left. Probably the more important function of the arms, and especially of the left arm, however, is to give an indication to the car behind as to what the driver of the front car is going to do.

While for the purpose of illustrating my invention, I have shown mechanically operated arms, it is of course obvious that the rocking of the controlling member may be arranged to close electric contacts in any one of a number of well known ways, to set signals at the front, side or rear as may be desired, and I therefore do not confine myself to the particular embodiment shown.

Regarding the controlling member itself, it may be made of any suitable material, preferably of metal, and when in the form of a yoke, the forks thereof while sufficiently stiff to properly operate the signals, yet may be made yieldable under the application of reasonable force to permit of adjustment to closely or loosely embrace the leg as may be preferred. If it is desired to operate only a left signal, said signal to indicate either stop or turn, one fork of the yoke may be omitted and in such cases the controlling member may be modified.

I have shown no specific means for making the semaphore arms readily visible at night, but it is obvious that a small candle power light may be arranged near the pivot point of each arm to be lighted as the arm starts to move out to signaling position.

As already suggested, my improved signal controlling means is not limited to the operation of mechanical signals such as shown, but said controlling member may close electric circuits to operate signals in numerous ways and in closed body cars it may be preferable that electrical signals be used and displayed at the rear.

In some designs of vehicles, it may be more convenient to have the signals, such as the semaphore arms shown, mounted on the side frames of the car in the rear of the driver's seat, and in such vehicles, the connections from the controlling member would most conveniently extend to the rear under the seat of the driver and of course the position of the controlling member would be reversed, as will be readily understood.

What I claim as new is:

1. In a vehicle signal, the combination with a signal device, of means to control the setting of said device, said means constructed and arranged to be controlled by a lateral movement of one leg of the driver without displacing movement of the foot.

2. In a vehicle signal, the combination with a signal device, of means for setting said device including a member adapted to be engaged by the leg of the driver between the ankle and the knee to be moved by a lateral movement of the leg without displacing movement of the foot.

3. In a vehicle signal, the combination with a signal device, of a yoke adapted to embrace a leg of the driver between the ankle and the knee to be moved by a lateral movement of the leg without lateral displacement of the foot, and connections between said yoke and signal device.

4. In a vehicle signal, the combination with a plurality of signals, of means to control the setting of said signals, said means constructed and arranged so that a lateral movement of the leg in one direction controls the setting of one signal, and a lateral movement of the leg in the other direction controls the setting of another signal, said lateral movement in either direction serving without lateral displacement of the foot to control said signals.

5. In a motor-driven vehicle having a pedal, a signal device, a signal controlling member situated adjacent the said pedal and in position to be engaged by a leg of the driver when the foot thereof is in normal position on said pedal, said member operable to control said signal by rocking movement of the leg without displacing movement of the foot.

6. In a vehicle signal, the combination with a vehicle of a signal having operating means positioned and arranged to be controlled by a sidewise movement of one leg of the driver without movement of the foot.

7. In a device of the character described, comprising in combination a steering post of a motor vehicle, a signal controlling device mounted on said post and adapted to be engaged and moved by a rocking movement of one leg of the driver without displacing movement of the foot, and a signal controlled by said device when so moved.

Signed at New York city, New York, this 5th day of April, 1919.

GEORGE M. DOWE.